United States Patent Office 3,025,269
Patented Mar. 13, 1962

3,025,269
ETHYLENE-DIETHYLENE GLYCOL MONOVINYL ETHER COPOLYMER
John D. Calfee, Dayton, Ohio, assignor to Monsanto Chemical Company, St. Louis, Mo., a corporation of Delaware
No Drawing. Filed Dec. 28, 1959, Ser. No. 862,088
8 Claims. (Cl. 260—77.5)

The present invention is directed to interpolymers of ethylene and diethylene glycol monovinyl ether, and to a method of preparing same by the interpolymerization of ethylene and diethylene glycol monovinyl ether.

It is further directed to curing ethylene/diethylene glycol monovinyl ether copolymers by treating same with polyisocyanates, and to the resulting cross-linked polymers.

The ethylene/diethylene glycol monovinyl ether interpolymers of the present invention are prepared under conditions ordinarily employed in the high pressure polymerization of ethylene.

It has previously been found that hydroxyl-containing vinyl compounds do not readily copolymerize with ethylene, apparently because they function to some extent as chain transfer agents, thereby inhibiting the copolymerization, or causing the production of low molecular weight liquid materials.

It has now been discovered, however, that ethylene and the monovinyl ether of diethylene glycol $$(CH_2=CH-O-CH_2CH_2-O-CH_2CH_2-OH)$$

are capable of copolymerizing, particularly in certain molecular proportions, to produce solid polymers.

It is an object of the present invention to provide a polymer with hydroxyl-containing groups substituted on a hydrocarbon backbone. It is a further object to provide a straightforward procedure for producing such polymers. The presence of hydroxyl groups in such a polymer will improve various properties of the polymer such as moisture vapor transmission properties, ink receptivity, and will also provide reactive groups for curing, cross-linking, or for the addition of various groups to modify the properties of the polymer in various ways as may be desired. It is believed that the hydroxyl-containing polymers of the present invention can be accurately described as having the branched structure characteristic of high pressure polyethylene substituted at intervals by —O—CH$_2$CH$_2$—O—CH$_2$CH$_2$—OH groups, as represented by the formula:

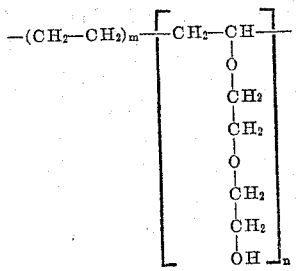

wherein $m$ and $n$ represent integers, the sum of which is dependent upon the number of monomer units in the copolymer. The integer $n$ will not ordinarily be greater than the integer $m$, and in order to retain the valuable properties of polyethylene, with the additional advantage of the hydroxyethoxy substituents, the integer $n$ will ordinarily have a ratio to $m$ in the range of 1:50 to 1:6. In fact, the use in the monomer charge of more than 15% or so by weight of the monovinyl ether of diethylene glycol will be disadvantageous in causing production of lower molecular weight materials and lowering conversions. It will be realized that the above structure represents an average of the units in the molecule, and that some units can have more side chains and some can have fewer side chains for a specified length of the main molecular chain. It will also be understood that the hydrocarbon chain can itself be branched to a certain degree, and the main chain of the molecule can contain a very small percentage of ether groups. The polymers of the present invention are ordinarily insoluble in water.

Thus, the present invention provides a polymer having primary hydroxyl groups separated by β-ethoxyethoxyl groups from the hydrocarbon backbone of the polymer. While the present invention is primarily concerned with solid copolymers and their preparation, it will be understood that waxy and liquid interpolymers of ethylene and diethylene glycol monovinyl ether are within the present invention, and have various uses as intermediates and in coating applications and are subject to cross-linking and curing to solid materials by use of polyisocyanates as discussed herein.

A hydroxyl containing polymer which has previously found extensive use is polyvinyl alcohol, which has secondary hydroxyl groups directly attached to a hydrocarbon backbone. In the usual preparation of polyvinyl alcohol, however, it is necessary to first polymerize vinyl acetate and then to remove acetate groups by hydrolysis. In the present invention, no such hydrolysis is necessary. Moreover, the secondary hydroxyl groups in polyvinyl alcohol will not react as readily with isocyanates as will the primary hydroxyls in the present polymers; in addition, ester and similar derivatives formed from primary hydroxyls are more stable than such derivatives formed from secondary hydroxyls.

The process of the present invention is carried out under conditions which cause the polymerization of ethylenically unsaturated monomers to high molecular weight solid materials, particularly under the conditions which are employed in the high pressure polymerization of ethylene. The interpolymerization of the present invention can be carried out at ethylene pressures from about 5,000 p.s.i. gauge to 50,000 p.s.i. gauge at temperatures of about 50° C. to 250° C. but is preferably carried out at pressures from about 15,000 p.s.i. to 50,000 p.s.i. and at temperatures from 100° C. to 200° C. It is, of course, possible to employ higher temperatures up to 200,000 p.s.i. or even up to 1,000,000 p.s.i. or more, but such extremely high pressures are not required. It is also possible to employ lower pressures down to 500 p.s.i. or so or even down to atmospheric pressure, provided that suitably active catalysts are employed along with high temperature, but the use of such low pressures ordinarily requires extremely long reaction times and results in production of lower molecular weight materials than are obtained at higher pressures. Similarly, it is possible to employ higher temperatures so long as they do not cause pyrolysis or unduly rapid reaction under the reaction conditions, and it is also possible to employ lower temperatures, even down to room temperature or the like, although the reaction will not be very rapid at low temperatures. Moreover, when catalysts which dissociate in the polymerization reaction are employed, it is preferred to employ temperatures high enough to cause such dissociation.

It is known that ethylene will polymerize at elevated temperature and pressure in the absence of catalysts, particularly if the ethylene happens to contain trace small amounts of oxygen which have a catalytic effect. However, in the present invention, it is preferred to employ free radical initiating catalysts to insure the preparation of solid products in reasonable reaction times. In general, ethylene polymerization catalysts, including oxygen, are suitable. On a weight basis, about 10 to 200 parts per million of oxygen is very suitable at 20,000 to 40,000 p.s.i. ethylene. Among the preferred catalysts are the peroxide catalysts and the azo catalysts. Among the peroxide type catalysts are, for example, ditolyl peroxide, benzoyl peroxide, diacetone peroxide, succinyl peroxide, acetyl peroxide, acetylbenzoyl peroxide, metabromobenzoyl peroxide, lauroyl peroxide, 2,2-bis-t-butylperoxybutane hydrogen peroxide, zinc peroxide, peracetic acid, alkali metal persulfates, perborates and percarbonates, ammonium persulfate, perborate and percarbonate and, in general, all those peroxide compounds which are either formed by the action of hydrogen peroxide on ordinary acids or else which give rise to hydrogen peroxide on treatment with dilute sulfuric acid. These materials are peroxy compounds as defined in Webster's International Dictionary (1935) 2d edition, [page 3 of Patent 2,396,920 and column 3 of Patent 2,748,170]. As examples of suitable azo catalysts may be mentioned bisbenzene diazosuccinate, the inorganic acid salts of 2,2'-diguanyl-2,2'-azopropane, 2,2'-azobis-(methylisobutyrate) or 2,2'-azobis(isobutyramide). The catalyst will ordinarily be employed in as small quantity as will produce the desired polymer in a reasonable reaction time. Moreover, the amount of catalyst has some effect on molecular weight as larger amounts of catalysts ordinarily cause the production of lower molecular weight materials. However, the amounts of catalysts employed will ordinarily be within the range of 0.0005 percent to 2 percent, based on the monomers. The interpolymers of the present invention are solid materials preferably having molecular weights of at least 2,000 and ordinarily having molecular weights ranging from 20,000 to 50,000 or 100,000 and can even have molecular weights as high as 1,000,000 or more. The molecular weights referred to are those calculated in the conventional manner on the basis of the viscosity of the polymer in solution as described in the Journal fur Praktischemie, 2nd series, volume 158, page 136 (1941) and Journal of the American Chemical Society, 73, page 1901 (1951). The following examples are set forth as illustrative of certain embodiments of the present invention.

*Example 1*

A bomb capable of withstanding high pressure was mounted in a shaker and provided with means for maintaining ethylene at constant pressure therein. The bomb was charged with 4 grams of diethylene glycol monovinyl ether, 0.02 gram of benzoyl peroxide, and then 120 grams of ethylene was charged during a 6-hour polymerization at 25,000 p.s.i. gauge. The bomb jacket temperature was 80° C., and the internal temperature during the polymerization rose from 80° C. to 170° C. The polymerization produced about 40 grams of copolymer (dry weight). The crystalline polymer melted fairly sharply at 105° C., and was slightly wettable by water.

The ethylene/diethylene glycol monovinyl ether copolymer in finely divided powder form was milled at 120° C. (at which it had low viscosity) with 5 parts per hundred by weight of 4,4'-methylene diphenyl isocyanate (4,4'-diisocyanato-diphenylmethane), and cured in a mold at 160° C. for 30 minutes. The resulting cured polymer was not completely melted even at 200° C.; in addition, the viscosity of the melted portion was much higher than that of the uncured copolymer, and solubility tests showed a high percentage of insoluble gel. The cross-linking evidenced by the great change in properties and insolubility in solvents such as xylene confirm the presence of the hydroxyl groups in the copolymer.

*Example 2*

A bomb was charged with 6 grams diethylene glycol monovinyl ether, 120 grams ethylene and 0.02 gram benzoyl peroxide and polymerized at temperatures (internal) of 75° C. to 130° C. for 13 hours. About 13 grams of copolymer, M.P. 120–125° C., was obtained. The copolymer was milled on a hot mill to remove water, and 0.5 gram of 4,4'-methylene diphenyl isocyanate was milled into 10 grams copolymer. The copolymer was then cured at 160° C. for 30 minutes. The cured copolymer is not completely melted even at 160° C. and is much more viscous in the softened state than the uncured copolymer.

*Example 3*

A charge of 125 grams ethylene, 10 grams diethylene glycol monovinyl ether, and 0.005 cc. ditertiarybutyl peroxide was polymerized at a temperature of 120° C. to produce ethylene/diethylene glycol monovinyl ether copolymer.

*Example 4*

A charge of diethylene glycol monovinyl ether, 10 grams, and 0.01 cc. of tertiary-butyl perbenzoate was copolymerized with ethylene at 25,000 p.s.i. gauge over a 12-hour period (the estimated ethylene charge being 125 grams). The bomb jacket was maintained at 115° C., and the internal temperature was 106° C. The reaction produced 26 grams of solid ethylene/diethylene glycol monovinyl ether copolymer, which had specific viscosity of 0.026 (based on measurement at 0.1% by weight in xylene at 100° C.)

*Example 5*

The procedure of Example 4 was repeated, but utilizing 20 grams diethylene glycol monovinyl ether and 120 grams ethylene at 35,000 p.s.i. gauge to produce 15 grams of the copolymer, which had specific viscosity of 0.028.

*Example 6*

The procedure of Example 4 was repeated using 20 grams diethylene glycol monovinyl ether to obtain 6 grams of the copolymer, which had specific viscosity of 0.036.

The ethylene interpolymers of the present invention can be employed in the applications for which ethylene polymers are ordinarily employed, that is in molding uses, as coatings, films, and the like, and will have the valuable properties due to the presence of the

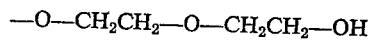
$-O-CH_2CH_2-O-CH_2CH_2-OH$ groups on the polyethylene backbone. The hydroxyl groups will be particularly valuable in improving the moisture vapor transmission properties and the ink receptivity for printing in such applications as packaging and other film uses. Moreover, the presence of the reactive groups on the polyethylene structure makes it possible to cross-link the polymers, thereby producing materials as disclosed and claimed herein having greater high temperature resistance, that is, higher softening and melting points, which is particularly valuable in electrical applications.

The present invention provides a method of obtaining a controlled amount of hydroxyl-containing groups in an otherwise essentially hydrocarbon polymer. This is a great improvement over other methods such as attempting to control the proportions of free hydroxyl groups in polymers such as polyvinylacetates by partial hydrolysis thereof. Moreover, the hydroxyl groups in the present polymers are primary hydroxyls.

The ratio of the monomers provided for in the preparation of the copolymers of the present invention can vary considerably, and so long as both polymers are present in substantial amounts, the copolymers are considered within the invention, but ethylene is ordinarily present in at least 50% by weight of the total monomers. Moreover, to obtain good polymerization and desirable polymer properties, it is generally necessary to employ amounts of diethylene glycol monovinyl ether within the range of about 2 to 20% of the total monomer charge. In addition to the ethylene and diethylene glycol monovinyl ether, minor amounts of other vinyl compounds, e.g., vinyl acetate, can also be employed, such as in amounts up to 15% or so by weight of the monomer charge.

As the organic isocyanate cross-linking agents employed in the present invention, any organic polyisocyanates capable of reacting with groups containing active hydrogen to form addition products can be employed. Generally, the cross-linking agents will be hydrocarbon diisocyanates, such as those represented by the formula $$R(NCO)_2$$

where R represents a divalent aliphatic or alicyclic hydrocarbon group of 2 to 18 carbon atoms, or divalent hydrocarbon residues of benzene, naphthalene, diphenyl, diphenyl alkanes, or triphenyl alkanes. Typical of the polyisocyanates which can be employed are trimethylene diisocyanate, tetramethylene diisocyanate, pentamethylene diisocyanates, hexamethylene diisocyanate, decamethylene diisocyanate, 2-decyl-1, 3-diisocyanatopropane, p-phenylenediisocyanate, 4,4'-methylene diphenyl isocyanate, toluene 2,4-diisocyanate, 2,4-diisocyanato-1-chlorobenzene, 1,2,4-benzene triisocyanate, 1,4-cyclohexylene diisocyanate. It will be realized that homologues of the foregoing can be employed, and it will also be possible to employ analogs, such as the corresponding thioisocyanates. The part of the molecule intermediate to the isocyanate groups can contain other groups such as halogen, ether, thioether, tertiary amino, sulfone, etc., groups which do not contain active hydrogen atoms. The organic polyisocyanates can be employed in the form of their precursors, e.g., phenyl urethanes, or generated in situ in the curing reaction, as by eliminating hydrogen chloride from the corresponding carbamic chloride compounds. The reaction with organic isocyanates will generally produce urethane groups, and the resulting products can be considered polyurethanes.

The amount of organic isocyanate employed in the curing reaction can be varied to some extent, depending upon the amount of cross-linking desired, but amounts in the range of about 1 to 4 or 5% by weight based on the hydroxethylvinyl ether-ethylene copolymer are usually suitable. Larger amounts, such as up to 40 or 50% by weight can be employed. It will often be desirable to use approximately the amount of organic polyisocyanate stoichiometrically required to react with all the free hydroxyl groups in the interpolymer, although greater or lesser amounts can be employed; if greater amounts are used, the resulting product will have free isocyanate groups which can be further reacted with various groups, such as carboxyl, amino, hydroxyl, etc., groups of various other monomeric or polymeric materials.

The curing action with isocyanates can, if desired, be conducted in the presence of an inert solvent, particularly any inert, preferably hydrocarbon or chlorinated hydrocarbon, solvent having substantial solvating properties for ethylene/diethylene glycol monovinyl ether polymer and organic isocyanate. For example, such relatively non-violatile aromatic solvents as toluene, xylenes, etc., can be employed.

If desired, catalysts, such as tertiary amine catalysts, can be employed to accelerate the curing reaction. Moreover, small amounts of water or water-containing materials can be added to or included in the curing polymer mixture in order to produce foamed products.

It will be advantageous to stabilize the polymers of the present invention, in either cured or uncured forms, against attack of the ether linkages therein by acid, and against oxidation and other possible causes of degradation. Acid scavengers and anti-oxidant stabilizers are suitable for this purpose, particularly those stabilizers known as polyvinyl chloride stabilizers, such as organotin compounds, organo-lead compounds, alkaline earth metal salts of long chain fatty acids, and epoxy compounds, e.g., stannous stearate, lead stearate, dibutyl tin dilaurate, epoxy resins, glycidyl ethers of polyalkylene glycols, such as 2,3-epoxybutyl ether of diethylene glycol, etc. The polymers of the present invention can also be stabilized by antioxidants which are antioxidants for natural or synthetic rubber; the antioxidants can be employed individually, or admixed with each other or with one or more polyvinyl chloride stabilizers. The phenolic type and amine type antioxidants are the preferred types for use herein, e.g., sulfides of dialkyl phenols, particularly sulfides of alkyl cresols, such as 4,4'-thiobis-(6-tert-butyl-m-cresol), "Age Rite White" (symmetrical di-betanaphthyl-p-phenylenediamine), etc. The stabilizers can be incorporated in the polymers in conventional manner in amounts from 0.005 weight percent for the most effective stabilizers to 5.0 weight percent for the least effective stabilizers.

The polymers of the present invention can also be blended with plasticizers, such as polyester type plasticizers, fillers, such as cellulose, starches, carbon blacks, silicates, clays, etc., and with other resin-compounding ingredients.

What is claimed is:

1. A high molecular weight normally-solid copolymer of ethylene and diethylene glycol monovinyl ether in which polymerizate of the said ether constitutes about 1% to 20% by weight of the polymer.

2. The method of claim 7 in which a peroxide catalyst is employed.

3. The method of claim 7 in which an azo catalyst is employed.

4. The method of preparing a cross-linked ethylenic polymer which comprises copolymerizing ethylene and diethylene glycol monovinyl ether, the said ether constituting 2 to 20% by weight of the total monomer charge, at temperatures from 100° to 200° C. and pressures of about 15,000 to 50,000 p.s.i. in the presence of a free radical initiating ethylene polymerization catalyst and treating the resulting copolymer with a small amount of organic polyisocyanate.

5. An ethylene/diethylene glycol monovinyl ether copolymer in which polymerizate of the said ether constitutes about 1% to 20% by weight of the polymer, with hydroxyl groups converted to urethane group by reaction with organic diisocyanates.

6. The method of curing ethylene/diethylene glycol monovinyl ether copolymer which comprises heating same with an organic polyisocyanate.

7. The method of preparing a high molecular weight interpolymer which comprises copolymerizing diethylene glycol monovinyl ether and ethylene at temperatures from 100° to 200° C. and pressures of about 15,000 to 50,000 p.s.i. in the presence of a free-radical initiating ethylene polymerization catalyst, the monomers being provided in amounts such that the diethylene glycol monovinyl ether constitutes 2 to 20% by weight of the total monomer charge.

8. Normally solid copolymer of ethylene and diethylene glycol monovinyl ether characterized by a hydrocarbon chain substituted at intervals by $$-O-CH_2CH_2-O-CH_2CH_2-OH$$

groups, the polymer conforming substantially to the structure
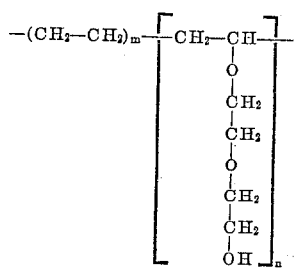
wherein $m$ and $n$ represent integers in a ratio such that the said ether constitutes 2 to 20% by weight of the polymer.
References Cited in the file of this patent
UNITED STATES PATENTS
2,467,234    Sargent _____ Apr. 12, 1949
2,828,220    McWherter _____ Mar. 25, 1958
OTHER REFERENCES
Schildknecht: "Vinyl and Related Polymers," Wiley & Sons (1952), page 529.

Notice of Adverse Decision in Interference

In Interference No. 93,494 involving Patent No. 3,025,269, J. D. Calfee, ETHYLENE-DIETHYLENE GLYCOL MONOVINYL ETHYL COPOLYMER, final judgment adverse to the patentee was rendered Dec. 23, 1965, as to claims 1, 2 and 7.

[*Official Gazette February 15, 1966.*]